(12) United States Patent
Bromann et al.

(10) Patent No.: US 10,100,842 B2
(45) Date of Patent: Oct. 16, 2018

(54) COVER OF A TURBOMACHINE CENTRIFUGAL COMPRESSOR CAPABLE OF BEING RIGIDLY CONNECTED VIA THE DOWNSTREAM SIDE NEAR TO THE UPSTREAM EDGE OF SAME, AND TURBOMACHINE COMPRISING THIS COVER

(71) Applicant: SAFRAN AIRCRAFT ENGINES, Paris (FR)

(72) Inventors: Alain Marc Lucien Bromann, Moissy-Cramayel (FR); Kamel Benderradji, Moissy-Cramayel (FR); Pamela Dominique Daniele Reichert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 391 days.

(21) Appl. No.: 14/904,880

(22) PCT Filed: Jul. 17, 2014

(86) PCT No.: PCT/FR2014/051842
§ 371 (c)(1),
(2) Date: Feb. 2, 2016

(87) PCT Pub. No.: WO2015/008000
PCT Pub. Date: Jan. 22, 2015

(65) Prior Publication Data
US 2016/0195099 A1 Jul. 7, 2016

(30) Foreign Application Priority Data
Jul. 18, 2013 (FR) ...................................... 13 57109

(51) Int. Cl.
*F04D 29/42* (2006.01)
*F04D 17/10* (2006.01)
(Continued)

(52) U.S. Cl.
CPC .......... *F04D 29/4206* (2013.01); *F01D 11/14* (2013.01); *F01D 25/243* (2013.01);
(Continued)

(58) Field of Classification Search
CPC .... F04D 17/10; F04D 29/622; F04D 29/4206; F04D 29/624; F04D 29/681;
(Continued)

(56) References Cited

U.S. PATENT DOCUMENTS 4,248,566 A * 2/1981 Chapman ............ F04D 27/0215
415/26
4,687,412 A 8/1987 Chamberlain
(Continued)

FOREIGN PATENT DOCUMENTS

EP 1 167 722 A2 1/2002
EP 2 206 882 A2 7/2010
(Continued)

OTHER PUBLICATIONS

International Search Report dated Jan. 12, 2015 in PCT/FR14/051842 Filed Jul. 17, 2014.
(Continued)

*Primary Examiner* — Ninh H Nguyen
*Assistant Examiner* — Topaz L Elliott
(74) *Attorney, Agent, or Firm* — Oblon, McClelland, Maier & Neustadt, L.L.P.

(57) ABSTRACT

A cover of a centrifugal compressor intended to be rigidly connected to a turbomachine housing, which includes a plurality of ports, is provided. The cover further includes a fastening device for fastening the cover to the housing. A
(Continued)

portion of the fastening device is located upstream relative to the ports and can be accessed by a fastening tool through at least one of the ports of the cover. A turbomachine uses this cover to form a sealed space, in particular with a view to collecting air.

10 Claims, 1 Drawing Sheet

(51) Int. Cl.
    *F04D 29/62*     (2006.01)
    *F01D 25/24*     (2006.01)
    *F01D 11/14*     (2006.01)
    *F02C 6/08*     (2006.01)
    *F01D 5/00*     (2006.01)

(52) U.S. Cl.
    CPC ............... *F02C 6/08* (2013.01); *F04D 17/10* (2013.01); *F04D 29/624* (2013.01); *F01D 5/005* (2013.01); *F05D 2230/60* (2013.01)

(58) Field of Classification Search
    CPC ........ F04D 27/023; F04D 27/025; F02C 6/08; F01D 25/243; F01D 11/14; F01D 5/005; F05D 2260/30
    USPC ........................................................ 415/201
    See application file for complete search history.

(56) References Cited

U.S. PATENT DOCUMENTS

| | | | | |
|---|---|---|---|---|
| 6,183,195 | B1 * | 2/2001 | Tremaine | F04D 29/4213 |
| | | | | 415/1 |
| 6,585,482 | B1 * | 7/2003 | Liotta | F02C 3/08 |
| | | | | 415/1 |
| 7,435,050 | B2 * | 10/2008 | Welch | F01D 25/243 |
| | | | | 415/201 |
| 7,824,151 | B2 | 11/2010 | Schwarz et al. | |
| 8,292,592 | B2 * | 10/2012 | Welch | F02C 7/04 |
| | | | | 415/201 |
| 8,616,854 | B2 * | 12/2013 | Mahan | F01D 5/026 |
| | | | | 416/245 R |
| 9,353,685 | B2 * | 5/2016 | Kling | F02C 7/05 |
| 9,650,916 | B2 * | 5/2017 | Barton | F01D 25/14 |
| 2010/0158668 | A1 | 6/2010 | Ottaviano et al. | |
| 2011/0002774 | A1 | 1/2011 | Karafillis et al. | |
| 2011/0076141 | A1 | 3/2011 | Joubert et al. | |

FOREIGN PATENT DOCUMENTS

FR      2 931 521 A1      11/2009
JP      3-260336      11/1991

OTHER PUBLICATIONS

Office Action dated Jun. 19, 2018, in Japanese Patent Application No. 2016-526683 (with English-language translation).

* cited by examiner

COVER OF A TURBOMACHINE CENTRIFUGAL COMPRESSOR CAPABLE OF BEING RIGIDLY CONNECTED VIA THE DOWNSTREAM SIDE NEAR TO THE UPSTREAM EDGE OF SAME, AND TURBOMACHINE COMPRISING THIS COVER

TECHNICAL FIELD

The present invention relates to the design of the cover of a centrifugal compressor in a turbine engine. It relates more particularly to the technique for the assembly thereof in the turbine engine in order to maintain the sealing of the space which is intended for the gases taken off and is defined by said cover, together with the casing of the turbine engine, at the periphery of the compressor.

The function of the centrifugal compressor in a turbine engine is that of injecting the high-pressure air supply into the combustion chamber. For this purpose, the rotor has a flared shape, taking air from the output of an axial compressor in order to direct said air radially into the recovery duct travelling to the combustion chamber. The cover forms the stator, that is the outer wall of the duct for the flow of air around the rotor.

It is known to take off air at the centrifugal compressor in order to use this high-pressure air as a source of power for turbine engine or of the aircraft equipment. Openings formed in the cover make it possible to take off said air in the duct of the compressor in order to convey it into the circuit which is to distribute it to the equipment which use it. In order fully benefit from this offtake, it is important for the circuit to be sealed. In order to achieve this, the cover is brought into sealed contact with parts of the casing around the offtake openings in order to create a recovery space at the input of the circuit which distributes the high-pressure air.

However, the cover of a compressor of this kind is a part which is difficult to install. This is because said cover must ensure that there is as little clearance as possible from the blades of the rotor in order to optimise the efficiency of the compressor. It must also ensure the continuity of the duct upstream and downstream. Conversely, the mechanical and thermal stresses related to the operation of the turbine cause significant deformation of all the parts in the region in which the cover is located, in particular of the rotor blades.

It is fairly common to fix the cover to the casing by means of an annular flange which is positioned downstream on said cover, in the region having the largest radius. However, the offtake openings are generally located in a region having an intermediate radius, further upstream on the cover. In this case, bolting said flange to the casing makes it possible to easily ensure the sealing of the recovery space, downstream of the offtake openings. The problem is therefore that of ensuring the sealing at the joint between the cover and another part of the casing, closing the recovery space upstream of the offtake openings. In order to achieve this result, the sealing must be ensured by joints between the part and the cover, as is described in U.S. Pat. No. 7,824,151, or by means of simple centering, as is proposed in EP2206882. These solutions limit the leaks, but do not ensure perfect sealing, in particular due to deformation of the parts between the different operating speeds of the turbine engine. This results in a loss of pressure, and therefore a reduction in performance, both for the compressor and for the system for taking off the high-pressure air.

Some designs of compressor covers, such as those described in US2011/0002774 and FR2931521, use a flange which is positioned upstream on the cover of the compressor and is bolted to the casing of the turbine engine in order to fix said cover. In this case, bolting of the flange ensures sealing of the space upstream of the cover. It is even possible to configure, as is the case in FR2931521, a structure which downstream, closes the space which surrounds the cover of the compressor.

However, when a flange is bolted on the upstream portion of the cover, in particular in order to ensure sealing in this region, it creates a problem of accessibility to the fixing means during assembly. This is because, either, a part of the structure or a flange blocks access to said means when the cover is positioned for assembly or, at best, the space located directly behind the fixing holes is restricted by the shape of the cover itself. In this case, it is necessary to design the structure of the turbine engine such that the fixing screws of the flange of the cover can be accessed from the cavity downstream of the axial compressor, located in front of the centrifugal compressor.

The object of the present invention is that of proposing a simple solution for easily fixing the cover, by the upstream edge thereof, to the casing of the turbine engine using a clamping means, and which can be adapted, without significant modification, to a design in which the casing of the turbine engine does not permit access to this portion of the cover during assembly.

DESCRIPTION OF THE INVENTION

The invention relates to a cover for a centrifugal compressor which is intended to be fixed to a casing of a turbine engine, comprising an upstream edge and a downstream edge in the flow direction of the gases crossing the compressor, said cover comprising a plurality of openings and fixing means. This cover is characterised in that upstream fixing means are located upstream relative to the openings and can be accessed by a fixing tool through at least one of said openings in the cover.

The object of facilitating assembly of the cover is achieved by the invention by means of permitting access from downstream to the fixing means when the cover is put in place. Clamping means can have been pre-positioned on the fixing means, and it is then sufficient to pass the fixing tool through the opening providing access to said means in order to fix the cover against the casing by clamping.

Advantageously this arrangement corresponds to openings intended for air offtake. The cover is thus initially intended to participate in a high-pressure air distribution system by taking off air in the region of the compressor. In this case, there is certainty that said openings are correctly positioned and dimensioned in order not to disrupt the operation of the compressor, and there is also no need to modify the design of the cover in this region.

Preferably, said upstream fixing means for the cover of the centrifugal compressor comprise an outer flange and fixing holes which pierce said flange, the unit being intended to cooperate with clamping means, of the screw and nut type, which can be actuated by the fixing tool. The holes in the flange are easy to machine and to position on the flange. The screw and nut system, which is widely used, makes it possible to easily fix the cover by clamping said cover against the casing. For example, since each upstream fixing means defines an axis corresponding to the rotation of the movable clamping means for the clamping thereof, said axis passes through at least one of said openings in the cover. In particular, in the case where fixing is achieved by bolting, this makes it possible to use a spindle wrench without a complex mechanism.

Advantageously, said outer flange forms a wall which completely surrounds said cover. Said flange, which is arranged so as to ensure a sealed circumferential connection, upstream of said openings, to a part of the casing when the fixing means are clamped, makes it possible to prevent air from the compressor, which passes through the openings in the cover, from escaping from the front during operation of the turbine engine. Firstly, this prevents the space which receives the air escaping through the openings in the cover from being brought into communication with the upstream stages of the turbine engine and disrupting the operation thereof. In addition, devices already described in the documents cited above make it possible to ensure sealing of the connection between the cover and the casing in the region of the largest radius thereof, downstream of the openings. Thus, during operation of the turbine engine, the fact that the flow in the compressor is brought into communication with the outside of the cover, via the openings used for allowing the fixing tools to pass through, does not have a detrimental effect on the efficiency of the compressor, since the pressure will equalise. Similarly, in view of an offtake of air for uses in other equipment, the lack of leaks in this region contributes to maintaining an elevated pressure in the air distribution circuit.

Advantageously, each fixing hole in the flange can receive a damping screw by passing through at least one of said openings in the cover. This makes it possible, for example, to pass the screws through after installing the cover on the casing. In a variant, if the holes in the flange are positioned on studs connected to the casing, the openings make it possible to pass through nuts and to install said nuts on the studs.

Preferably, said flange extends close to the upstream edge of the cover.

In a particular embodiment, the cover of the centrifugal compressor further comprises a downstream flange for holding against the casing of the turbine engine, which flange is fastened to the outer wall of the cover between said openings and the downstream edge and forms a sealing means. Using a downstream holding flange, which is arranged so as to ensure a sealed circumferential connection against the casing, makes it possible to easily adapt the cover in order to ensure perfect sealing of the space for receiving the gases taken off, and to permit easy assembly thereof. Advantageously, this flange is bolted onto the casing of the turbine engine.

The invention also relates to a turbine engine comprising a centrifugal compressor having a cover as described above, the casing of which is arranged so as to form a sealed connection to the upstream flange of the cover when the clamping means are clamped.

Advantageously, the casing is arranged so as to form, together with said cover, at least one closed space which recovers the air passing through the openings in the cover.

Advantageously, at least some of the openings in the cover, and said air recovery space, are designed to participate in an air offtake system.

DETAILED DESCRIPTION OF THE INVENTION

The present invention will be more readily understood and other details, features and advantages of the present invention will become clearer upon reading the following description with reference to the accompanying drawings, in which.

Figure 1:
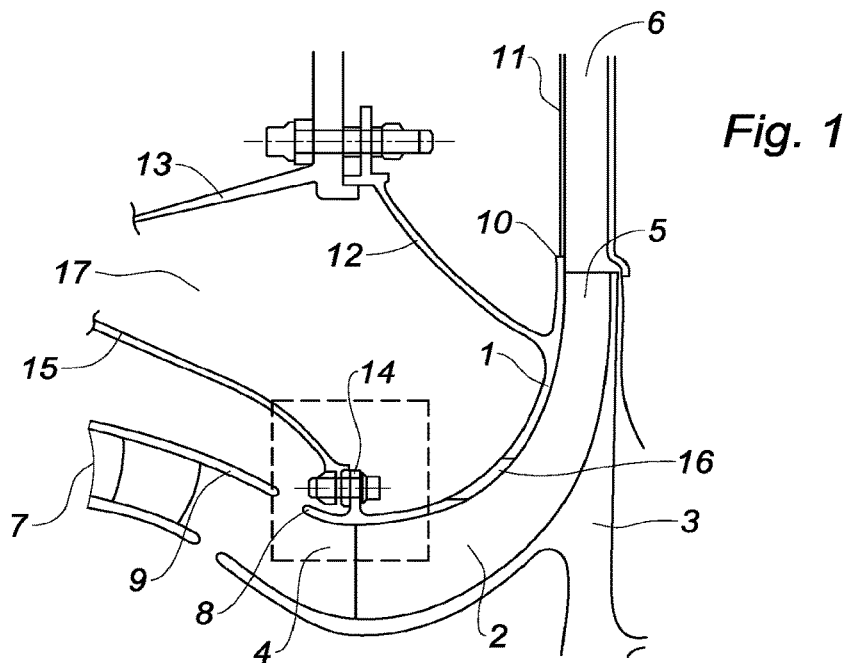
FIG. 1 is an axial section of a first embodiment of a turbine engine compressor comprising a cover according to the invention.

With reference to FIG. 1, the invention relates to the cover 1 of a centrifugal compressor, which forms the radially outer wall of the duct in which the blades 2 of the rotor wheel 3 rotate. The unit has a rotational symmetry about an axis which is not shown but which would be horizontal with respect to FIG. 1, and below the parts shown. By rotating about this axis, the rotor sucks air in through its input 4, which is axially oriented, in order to expel said air at higher pressure through its output 5, which is radially oriented. In a general manner, said compressor discharges its compressed air into a radial recovery duct 6 which is intended to supply the combustion chamber, which is not shown but is located on the right-hand side with reference to FIG. 1, and is supplied upstream by an axial compressor 7.

The cover 1 is a part which rotates about the axis of symmetry of the compressor, the shape of which follows, with minimal clearance, the surface swept by the radial end of the blades 2. In addition, the cover 1 is arranged so that the upstream leading edge 8 thereof ensures continuity in shape with the radially outer wall 9 of the duct of the axial compressor 7, and so that the downstream trailing edge 10 thereof ensures continuity in shape with the wall 11 of the recovery duct 6.

Fixing the cover on the casing of the turbine engine should make it possible to position said cover in a sufficiently precise manner in order to take account of the stresses mentioned above and to also permit the cover to move according to the operation of the turbine engine, in order to follow the deformation of the blades 2 while maintaining an optimal clearance.

Many types of solutions are proposed in the prior art, in particular fixing the cover by means of two flanges, such as in US2011/0002774 and EP2206882, which have already been cited. With regard to holding the cover, this assembly by means of two flanges overdetermines the fixing points of the cover, which must be taken into account in the type of connections made. However, it is entirely possible to achieve an assembly of this kind, as is shown in the documents cited in the prior art. It is within the scope of the invention to use other combinations between the flanges, by adjusting the resilience of the connections they provide.

A first embodiment according to the invention uses fixing of this kind, comprising two flanges. An annular flange 12, fastened downstream in the portion of the cover 1 having the maximum radius relative to the axis of rotation, is bolted to the edge of a circumferential part 13 of the casing. In addition, the cover is also fixed in the upstream portion thereof by a flange 14 to another part 15 of the casing, over the entire circumference thereof. Said flange 14 is a frustoconical part which extends radially outside the cover 1 and separates the upstream edge 8 from the downstream edge 10 over the entire circumference of the cover. Said flange is fixed to the cover 1 very close to the upstream edge 8 of the cover 1 and has a small radial extension. The connection between the cover and the part 15 of the casing is therefore made very close to the upstream edge 8. Said flange 14, on account of the position thereof, provides an additional benefit, which is set out below.

In some turbine engines, the cover also participates in a function of offtake of high-pressure air in the region of the compressor, in order to introduce said air into a distribution circuit towards various equipment inside the aircraft.

In the example shown, the cover 1 is pierced with a plurality of openings 16, one of which is shown in the section in FIG. 1. These openings 16 are located on a ring about the axis of symmetry, having a radius which is approximately equal to the minimal radius of the cover, on the upstream edge 8, and increased by a quarter of the difference from the maximum radius, on the downstream edge 10. Viewed in a different manner, said openings are also located in a region of maximum curvature of the axial profile of the cover 1. In this way, said openings are located in a region where the cover fulfils a lesser role for containing the flow inside the compressor. Said openings can thus be arranged to have a cross section which is sufficient to allow a fraction of the air circulating in the rotor to pass to the outer side of the cover, without causing significant deterioration in the operation of the compressor.

The air taken off is recovered in a recovery space 17, which itself is brought into communication with a distribution circuit (not shown). In the example shown in FIG. 1, said space 17 is delimited, close to the cover, by a portion of the cover 1, by means of:
  in the downstream direction, the downstream flange 12 and then an annular part 13 of the casing,
  in the upstream direction, the upstream flange 14 then an annular part 15 of the casing.

Figure 2:
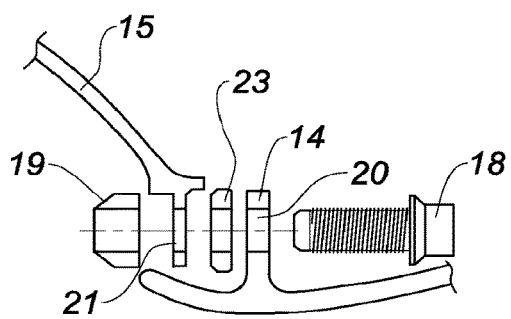
FIG. 2 is an enlargement of FIG. 1, in the upstream fixing region of the cover, showing an exploded view of the screw and nut.

Thus, as shown in FIG. 2, the upstream flange is fixed to the part 15 by means of systems consisting of a screw 18 and a nut 19 which pass through holes 20 and 21, the flange 14 and the part 15. Said holes are, of course, positioned so as to be facing one another during assembly of the cover. Said holes, in particular the holes 20 formed in the flange 14, are circumferentially distributed. The holes 20 which pierce the flange 14 thus form, together with the portion of the flange 14 which surrounds them, as many fixing means fastened to the cover 1. Said fixing means 20 cooperate with the holes 21 arranged on the edge of the annular part 15 and the bolting means, 18 and 19, in order to press the flange 14 against the part 15. The portions in contact with the flange and the edge of the part 15 are arranged, optionally with an interposed adjustment shim 23, so as to ensure that the connection is sealed with respect to the high-pressure air, by virtue of the pressure applied by the bolting means 18-19 when said means are clamped. Similarly, the downstream flange 12 is bolted to the edge of the part 13 of the casing and ensures that the space 17 for receiving the air taken off is sealed on the downstream side of the cover 1.

The flange 12 generally extends radially outside the cover, which makes it possible to access, from downstream of said flange, the end thereof bolted to the casing when assembling or disassembling the cover.

Figure 3:
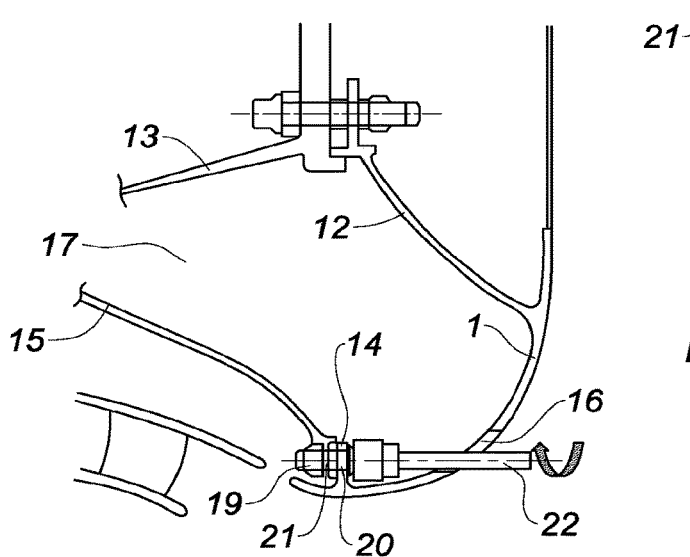
FIG. 3 is an axial section of the turbine engine, showing the cover of FIG. 1, during the assembly phase.

The difficulty in assembling this configuration lies in the fact that, in order to ensure sealing upstream of the cover, the part 15 of the casing approaches the upstream edge 8 of the cover 1 where the radius thereof is the smallest. During assembly in the turbine engine, the cover is installed downstream of the parts of the casing and of the compressor which are already assembled, as is shown in FIG. 3. The cover 1, similarly to the downstream flange 12, thus blocks access to the fixing means 20 and the bolting means 18-19. In the cover according to the invention, the openings 16 in the cover 1, which are provided for the offtake of air, have been located opposite the fixing holes 20 in the flange 14, such that a fixing tool, for example a wrench 22, can grip the head of the screw 18 (not visible in FIG. 3) by passing through the holes 20 in the flange 14 and the holes 21 in the part 15 of the casing, in order to screw said casing onto the nut 19.

In the example shown, the nut 19 is fixed opposite the hole 21 in the part 15 of the casing, on the upstream side thereof, and is prevented from rotating. It is thus possible to install the cover from the rear of the casing, in order to screw the screws 18 there in the nuts 19 through the holes 20 in the flange and the holes 21 in the part 15 of the casing, which holes have been aligned in advance. The offtake opening 16 permits the spindle of a wrench 22, aligned with the axis of the fixing hole 20, to pass through, which makes it possible to turn said wrench in order to screw the screw 18. Moreover, while still meeting the operating criterion of the compressor, this opening 16 is sufficiently large to permit the screw 18 to pass through, so as to introduce said screw into the nut 19 through the holes 20 and 21, as well as the head of the wrench 22 which cooperates with the head of the screw 18.

In a variant, the head of the wrench 22 can be narrower than that of the screw 18, conversely to what is shown in FIG. 3, if said wrench head cooperates with a hollowed pattern in the head of the screw. In this way, the screws 18 can have been pre-positioned on the fixing holes 20 of the upstream flange 14 of the cover before said cover is put into position on the casing. In this case, the cross section of the offtake opening 16 only has to permit a relatively narrow wrench 22 to pass through.

In another variant, the direction of the placement of the screws 18, or of the nuts 19, is reversed. The screw 18, which is prevented from rotating on the part 15 of the casing, thus forms a stud on which the hole 20 of the flange 14 comes into position, before the nut 19 is screwed.

The invention claimed is:

1. A cover for a centrifugal compressor which is intended to be fixed to a casing of a turbine engine, comprising an upstream edge and a downstream edge in the flow direction of the gases crossing the compressor, said cover comprising a plurality of openings and means for fixing to the casing,
  wherein the fixing means are located upstream relative to the openings, said fixing means cooperating with clamping means, and the clamping means can be engaged by at least a straight portion of a fixing tool through at least one of said openings in the cover.

2. The centrifugal compressor cover according to claim 1, wherein said openings are intended for an air offtake in the compressor.

3. The centrifugal compressor cover according to claim 1, wherein said fixing means comprise an outer flange and fixing holes which pierce said flange, and the clamping means include a screw and a nut.

4. The centrifugal compressor cover according to claim 3, wherein said outer flange forms a wall which completely surrounds said cover.

5. The centrifugal compressor cover according to claim 4, configured such that each fixing hole can receive one clamping screw passing through at least one of said openings.

6. The centrifugal compressor cover according to claim 3, wherein said outer flange extends close to the upstream edge of the cover.

7. The centrifugal compressor cover according to claim 3, further comprising a downstream flange for holding against the casing of the turbine engine, which downstream flange is fastened to the outer wall of the cover between said openings and the downstream edge and forms a sealing means.

8. A turbine engine comprising a centrifugal compressor having a cover according to claim 3, wherein a casing of the turbine engine is arranged so as to form a sealed connection with the upstream flange of the cover when the clamping means are clamped.

9. The turbine engine according to claim 8, wherein the casing of the turbine engine is arranged so as to form, together with said cover, at least one closed space which recovers the air passing through the openings in the cover.

10. The turbine engine according to claim 9, wherein at least some of the openings in the cover, and said at least one closed space, are designed to participate in an air offtake system.

\* \* \* \* \*

UNITED STATES PATENT AND TRADEMARK OFFICE
CERTIFICATE OF CORRECTION

| | | |
|---|---|---|
| PATENT NO. | : 10,100,842 B2 | Page 1 of 1 |
| APPLICATION NO. | : 14/904880 | |
| DATED | : October 16, 2018 | |
| INVENTOR(S) | : Alain Marc Lucien Bromann et al. | |

It is certified that error appears in the above-identified patent and that said Letters Patent is hereby corrected as shown below:

In the Specification

Column 3, Line 30, change "a damping screw" to --a clamping screw--.

Signed and Sealed this
Twenty-eighth Day of April, 2020

Andrei Iancu
*Director of the United States Patent and Trademark Office*